H. R. DAGGETT.
Tree-Protector.
No. 199,355. Patented Jan. 22, 1878.
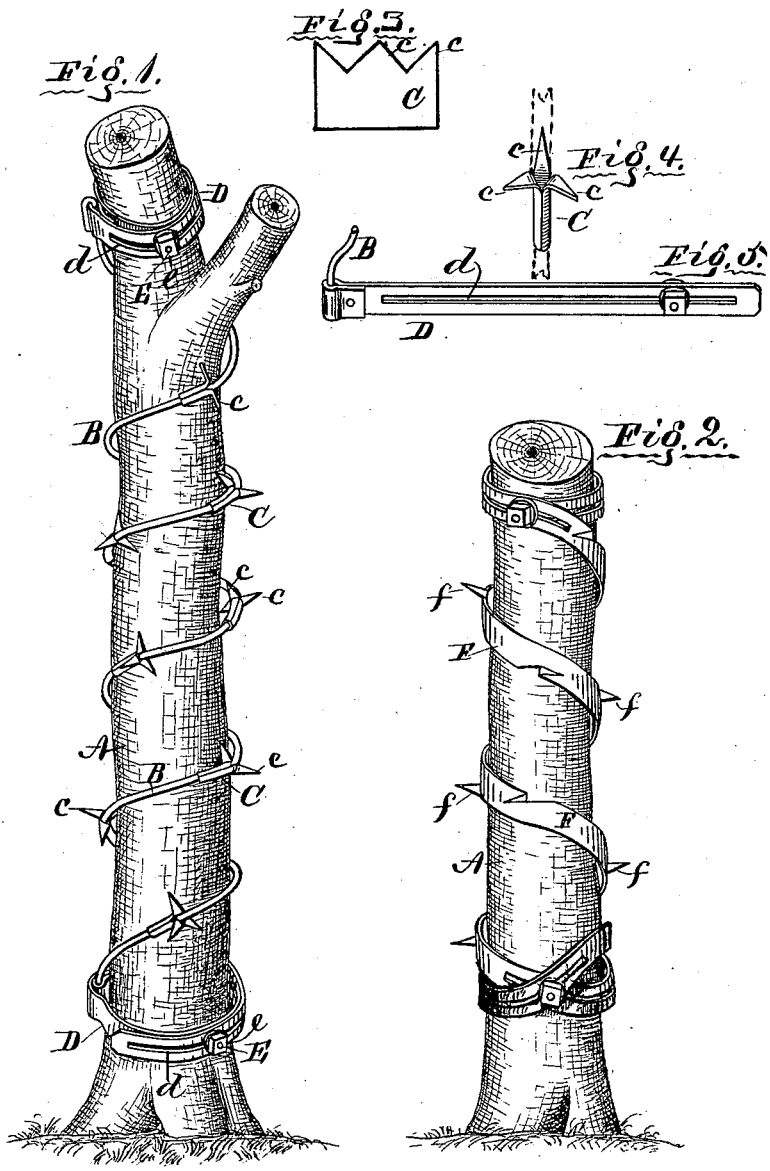
Witnesses:
M. H. Barringer.
P. R. Richards.
Inventor:
Henry R. Daggett,
By W. B. Richards,

UNITED STATES PATENT OFFICE.

HENRY R. DAGGETT, OF PAXTON, ILLINOIS.

IMPROVEMENT IN TREE-PROTECTORS.

Specification forming part of Letters Patent No. 199,355, dated January 22, 1878; application filed June 9, 1877.

*To all whom it may concern:*

Be it known that I, HENRY R. DAGGETT, of Paxton, in the county of Ford and State of Illinois, have invented certain new and useful Improvements in Tree-Protectors; and I do hereby declare that the following is a full, clear, and exact description thereof, which will enable others skilled in the art to which it appertains to make and use the same, reference being had to the accompanying drawing, and to the letters of reference marked thereon, which form a part of this specification.

This invention relates to devices for protecting the bark of trees from being injured by animals; and it consists in the construction, combination, and arrangement of parts, hereinafter set forth and claimed.

In the accompanying drawing, Figure 1 is a perspective view of my protector in place on the trunk of a tree. Fig. 2 is a modification; and Figs. 3, 4, and 5 are detail views, hereinafter referred to.

Referring to the drawing by letters, A represents the trunk or body of an ordinary tree. B is a wire, having barbs C attached thereto. The barbs C are formed of small plates of metal cut into forms, as shown at Fig. 3, and then bent or curved around the wire B, as shown at Fig. 4. D is a metallic band, having a longitudinal slot, *d*, as shown plainly at Fig. 5. One end of a band, D, is secured to each end of a wire, B, as shown in the drawings, or in any suitable manner.

The wire B should be wound spirally and loosely around the trunk A; and the barbs C, having three or more barbs, *c*, being loosely attached to the wire, two or more of the points, *c*, will rest against the tree and project the other barb or point outward. The pitch of the spiral in winding the wire upon the tree, to regulate the distance apart of the barbs, may be adjusted as occasion requires in trees located in different places, and subject or liable to different dangers. The bands D are wound around the tree and secured by bolts E, which pass through the slots *d*, and have nuts *e*, by which they may be loosely bolted, so as to expand with the enlargement of the tree-trunk, or be fitted snugly and expanded by unscrewing the nuts and sliding the bolts in the slots, as required.

Fig. 2 shows a modification in the construction of the barbed wire, being a strip of sheet metal, F, having barbs *f* cut in its sides, and its ends slotted and bolted, same as the bands D.

By winding with little pitch in the spiral, and by setting the barbs closely, all the protection necessary can be given against animals gnawing the bark of the tree. For protection against animals rubbing against the tree the pitch may be greater, and the barbs not so close to each other on the wire.

This protector forms a neat appliance at a very moderate expense, and can be quickly and easily applied to trees, and, if properly adjusted, cannot damage the tree.

Having thus described my invention, what I claim as new, and desire to secure by Letters Patent, is—

The herein-described tree-protector, consisting of the wire B, having barbs C and slotted bands D, said wire to be wound spirally around the tree-trunk, with the barbs projecting therefrom, and secured thereto by means of the slotted bands and bolts, substantially as and for the purpose set forth.

In testimony that I claim the foregoing as my own I affix my signature in presence of two witnesses.

HENRY R. DAGGETT.

Witnesses:
 WEAVER WHITE,
 JOHN B. SHAW.